No. 744,663. PATENTED NOV. 17, 1903.
C. E. W. WOODWARD.
TIRE CONSTRUCTION.
APPLICATION FILED SEPT. 23, 1901.
NO MODEL.
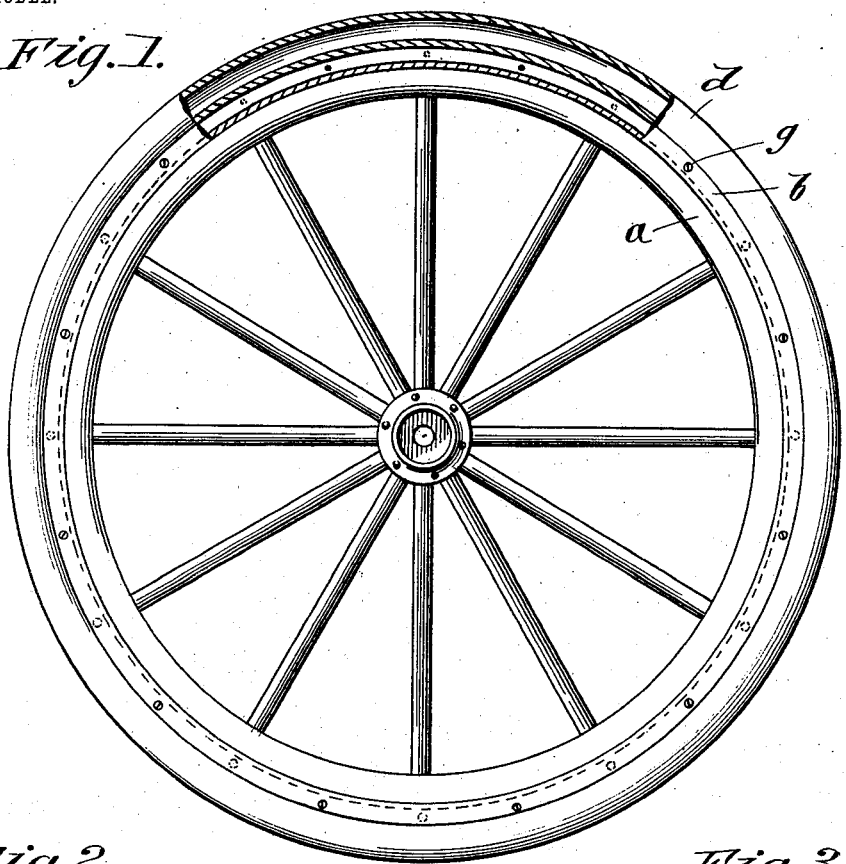
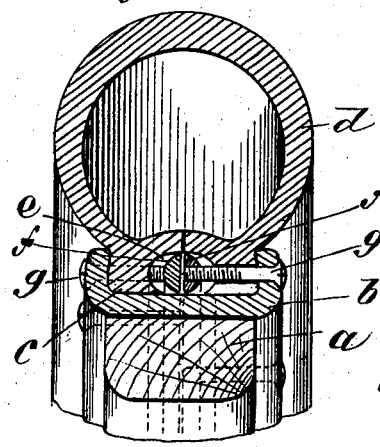
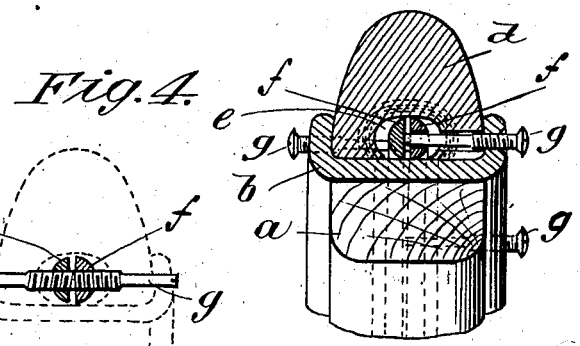

No. 744,663. Patented November 17, 1903.

UNITED STATES PATENT OFFICE.

CHARLES E. W. WOODWARD, OF CHICOPEE FALLS, MASSACHUSETTS, ASSIGNOR OF ONE-HALF TO FISK RUBBER COMPANY, OF CHICOPEE FALLS, MASSACHUSETTS, A CORPORATION.

TIRE CONSTRUCTION.

SPECIFICATION forming part of Letters Patent No. 744,663, dated November 17, 1903.

Application filed September 23, 1901. Serial No. 76,230. (No model.)

*To all whom it may concern:*

Be it known that I, CHARLES E. W. WOODWARD, a citizen of the United States of America, residing at Chicopee Falls, in the county of Hampden and State of Massachusetts, have invented new and useful Improvements in Tire Construction, of which the following is a specification.

This invention relates to wheel and tire constructions, and especially to means for attaching tires to the rims of metal wheels, or more properly to the metal rims of wheels, the object of the invention being to provide means whereby a tire may be strongly held to the rim by a base-piece on the tire, whereby as large a proportion as possible of the walls of the tire may be free to take whatever position is required of it under certain conditions of service and yet be strongly held in the rim and secured against circumferential creeping, and yet be readily removable in case of necessity.

The invention consists in the construction substantially as described, and set forth in the claims.

In the drawings forming part of this specification, Figure 1 is a side elevation of a wheel embodying my invention, portions thereof being broken away and shown in section. Fig. 2 is a transverse section of the rim and tire, on an enlarged scale. Fig. 3 shows a modification of the tire-securing devices and also illustrates these devices applied to a solid tire. Fig. 4 shows a second modification of the tire-securing devices.

In the drawings there is shown a wheel having a wooden felly $a$, with a metal rim $b$ secured thereon in the usual manner. This rim is trough-shaped, its upturned sides being adapted to receive the base portion $c$ of a tire $d$, and these sides are preferably slightly inclined one toward the other, whereby the channel in which the base-piece $c$ is located will be slightly undercut at the sides. The tire is provided with a circumferential channel $e$ in the base part thereof, which channel is open in the plane of the base $c$, the greatest transverse diameter of the channel $e$ lying, however, within the base $c$. Preferably the side walls of this channel are curved, as shown in Fig. 2. Within this channel $e$ the rings $f$ are located. These rings are of metal and of such shape in cross-section as to correspond substantially to the cross-sectional form of one side of the channel $e$, and at suitable intervals holes are bored in these rings to receive screws $g$, which pass through suitable holes in the upturned sides of the rim $b$ and through openings molded in the base of the tire. These openings, which cut the under side of the base of the tire, give to the latter such flexibility as to enable one to slip the tire when deflated over the upturned side of the rim when the rings $f$ have been loosened by turning out the screws $g$ more or less. Without this provision it would be impossible to remove a deflated tire without taking out all of the screws $g$. These screws are applied to the rings in such manner that the latter may be forced in opposite directions, one against each wall of the channel $e$, and thus bind the base of the tire primarily to the side walls of the rim $b$; but the walls of the channel and the bearing-surface of the rings being curved, as stated, the described lateral movement of the latter will have a tendency to bind the base to the bottom of the grooved rim to a greater or less extent at the same time.

There are a number of ways of applying the screws $g$ to the rings $f$, whereby the desired movement may be imparted thereto, and Figs. 3 and 4 show two modifications of the construction shown in Fig. 1. The particular method of applying the screws is, however, immaterial, though that shown in Fig. 2 is the preferred manner. As shown in said Fig. 2, suitably-spaced screws pass freely through the upturned sides of the rim and the base of the tire, and their threaded ends are entered in threaded holes in the rings, and by turning the screws the rings are drawn toward the sides of the rim, the screws for each ring being located on opposite sides of the rim. By this method the head of the screw always lies in its countersunk depression in the rim.

In Fig. 3 the screw has a threaded engagement with the side of the rim, and its point passing through the ring nearest to the screw bears against the flat side of the farther ring, the turning up of the screw forcing said last-named ring against the side of the rim opposite to that in which the screw is located. In this figure the invention is shown applied to a solid tire.

The method shown in Fig. 4 consists in making a screw which has a right and left hand thread thereon, one of the rings being engaged by one threaded part of the screw and the other ring by the oppositely-threaded part, the screw passing through both sides of the rim, and each end thereof preferably slotted to receive a screw-driver. On turning the screw both rings are simultaneously separated or drawn together.

The location of the screws $g$ in the sides of the rim and in the base of the tire provides positive means for locking the tire to the rim in such a manner as to entirely preclude the possibility of circumferential creeping of the tire in the rim. This is an important feature of the construction, as it has been found in practice that mere clamping of the tire to the rim will not prevent this action, owing to the yielding nature of the material of which the tire is constructed.

Having thus described my invention, what I claim, and desire to secure by Letters Patent of the United States, is—

1. The combination with a trough-shaped rim of a wheel, of a tire therefor, a base on said tire adapted to be located in said rim, said base having a circumferential channel therein, there being an opening on the side next the rim of less diameter than the greatest diameter of said channel, the walls of the latter being inclined toward said opening; two clamping-rings having an inclined surface corresponding to the inclined wall of said channel, and screws extending through the wheel-rim and base of said tire, and engaging said rings, whereby the latter may be laterally secured against opposite sides of said rim, and coincidently forced radially against the bottom of the rim.

2. The combination with a trough-shaped metal rim, of a tire, a base on the latter adapted to be located in said rim, said base having a circumferential channel therein and there being openings in the lower side of the base extending from each side thereof into said channel, whereby the tire may be easily passed over the upturned sides of the rim, together with clamping-rings located in said channel, and means for moving the rings transversely of the rim.

3. In combination with a trough-shaped rim, a tubular tire, a base thereon having a circumferential channel in that side thereof next to the bottom of said rim, said channel having walls inwardly inclined toward its open side, and said base having transverse openings in its under surface extending from each side into said channel; clamping-rings in the latter, and screws passing through the sides of the rim and through the openings in said base and engaging said rings, whereby the latter may be drawn against the sides of the rim, and a portion of the base forced radially against the bottom of the rim.

C. E. W. WOODWARD.

Witnesses:
Wm. H. Chapin,
K. I. Clemons.